US008862106B2

(12) United States Patent
Salisbury et al.

(10) Patent No.: US 8,862,106 B2
(45) Date of Patent: Oct. 14, 2014

(54) INTELLIGENT CALL FORWARDING

(75) Inventors: John Salisbury, San Diego, CA (US);
Dean Williams, San Diego, CA (US);
Kotaro Matsuo, San Diego, CA (US)

(73) Assignee: Greatcall, Inc., San Diego, CA (US)

( * ) Notice: Subject to any disclaimer, the term of this patent is extended or adjusted under 35 U.S.C. 154(b) by 38 days.

(21) Appl. No.: 13/584,157

(22) Filed: Aug. 13, 2012

(65) Prior Publication Data

US 2014/0045473 A1 Feb. 13, 2014

(51) Int. Cl.
*H04M 3/42* (2006.01)

(52) U.S. Cl.
USPC ............... 455/414.2; 455/414.1; 455/417; 455/412.1

(58) Field of Classification Search
CPC ................. H04M 3/42; H04M 4/00
USPC ............... 455/417, 414.1, 414.2
See application file for complete search history.

(56) References Cited

U.S. PATENT DOCUMENTS

| 6,745,025 | B1 * | 6/2004 | Chow et al. ............ 455/417 |
| 7,286,799 | B2 * | 10/2007 | Thrasher .............. 455/41.2 |
| 7,457,608 | B2 * | 11/2008 | Shah ................... 455/351 |
| 8,107,957 | B1 | 1/2012 | O'Neil et al. |
| 8,385,880 | B2 * | 2/2013 | Ewell et al. ............ 455/404.1 |
| 2005/0064855 | A1 * | 3/2005 | Russell ................ 455/417 |
| 2012/0171988 | A1 * | 7/2012 | Matsuo et al. .......... 455/404.2 |

* cited by examiner

*Primary Examiner* — Olumide T Ajibade Akonai
*Assistant Examiner* — Randy Peaches
(74) *Attorney, Agent, or Firm* — Kilpatrick Townsend & Stockton LLP

(57) ABSTRACT

Systems and methods for providing alternate communication paths for telephone calls. Calls directed to a telephone are relayed to a second electronic communication device, which may be a second telephone, based on the physical relationship of the telephone and the second device. According to one aspect, the physical relationship is automatically detected and compared with one or more conditions. When one of the conditions is met, an incoming call directed to the telephone is relayed to the second electronic communication device. Detection of the physical relationship may include detecting whether the telephone and the second device are in close proximity, whether one or both of the telephone and the second device is moving, or other aspects of the relationship. Relaying a call to the second device may be accomplished by call forwarding, a ring-no-answer treatment, three-way calling, or other methods.

25 Claims, 6 Drawing Sheets

INTELLIGENT CALL FORWARDING

BACKGROUND OF THE INVENTION

In the modern world, it is increasingly common for a person to have several associated telephone numbers. For example, a person may have a landline telephone at his or her place of residence, another landline telephone at his or her workplace, a personal wireless telephone, and a wireless telephone for business use. Each telephone typically has a different number. In addition, some persons may carry a simplified communicator device that is internally a telephone, but has a simplified user interface and is used for calling a designated number, for example a private response center as described in more detail below.

A person may wish to arrange for calls to one of his or her telephone numbers to be relayed to a different number. For example, the person may be expecting an important business call, but may need to step out of the office carrying only a mobile telephone. Certain mechanisms exist for forwarding or otherwise relaying calls directed to one telephone number to a different telephone number, but these mechanisms typically require complex manual setup, and may be easily forgotten.

BRIEF SUMMARY OF THE INVENTION

According to one aspect, a method providing an alternate communication path for telephone calls includes automatically detecting a physical relationship between two telephones, comparing the detected physical relationship with a predetermined condition, and causing a telephone call directed to a first one of the two telephones to be relayed to the second one of the two telephones when the condition is met.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, systems, structures, and other components may be shown as components in block diagram form in order not to obscure the embodiments in unnecessary detail. In other instances, well-known processes, procedures and techniques may be shown without unnecessary detail in order to avoid obscuring the embodiments.

Embodiments of the invention enable automated configuration of a telephone or telephone switching network so that calls directed to one telephone number can be relayed to a different telephone number. A physical relationship between two telephones is automatically detected, and arrangements are made to relay calls directed to one of the telephones to the other telephone, based on the state of the physical relationship. The relay may be accomplished by different mechanisms. Thus, a user may receive relayed calls automatically without the need to manually configure either telephone or a telephone switching network.

Figure 1:
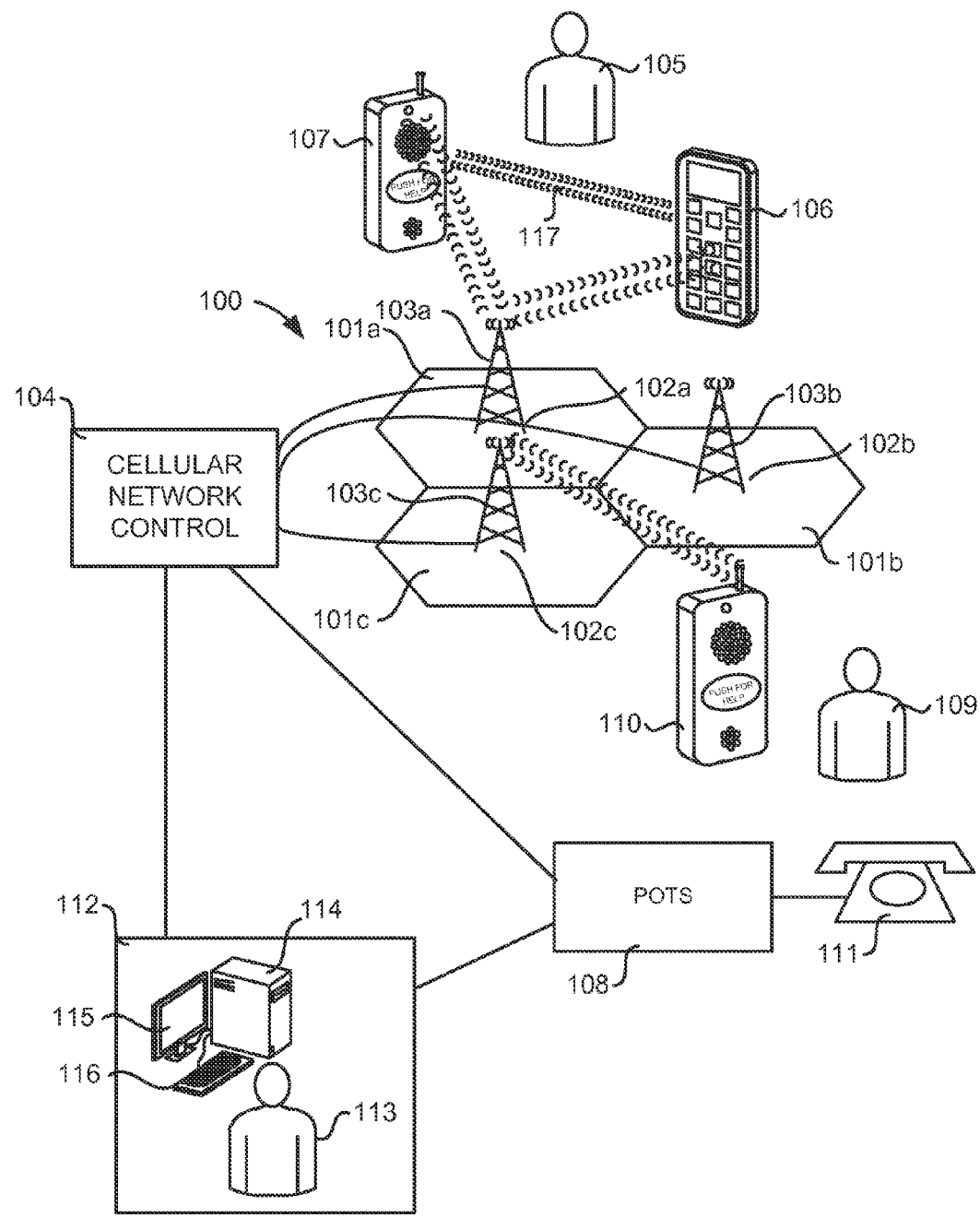
FIG. 1 illustrates various entities and devices that may interact in embodiments of the invention.

FIG. 1 illustrates various entities and devices that may interact in embodiments of the invention.

A cellular telephone network 100 includes a plurality of cells 101a-101c. Cellular networks are an especially efficient way to provide mobile telephone service. Each cell 101a-101c is served by a respective base station 102a-102c, which often includes an antenna mounted on a tower 103a-103c. Each cellular telephone active in a particular cell can bi-directionally interact with the base station of the cell, enabling full duplex communication of data and/or voice. Each cell 101a-101.c is capable of communicating with mobile telephones within the respective cell according to a physical interface scheme (e.g., CDMA, LTE, GSM, GPRS, WiMax, etc.). Each base station 102a-102c typically is capable of communicating simultaneously with at least several dozen different mobile telephones.

Adjacent cells use different frequencies or coding to avoid interference. In this way, many mobile telephones can be supported using a limited spectra. The size and density of the cells may be determined in part by the demand for service. While only three cells 101:a-101c are shown in FIG. 1, many cells may be present. Special hand-off protocols may be used for maintaining communication with a particular telephone that moves from one cell to another during a call, As shown in FIG. 1, each base station 102a-102c communicates with a cellular network controller 104. It will be understood that FIG. 1 is highly simplified, and that cellular network controller 104 represents a wide array of hardware, software, and other components performing a wide variety of functions. For example, cellular network controller 104 may route calls between cells 101a-101c and outside telephone providers, monitor telephone usage, maintain billing records for individual telephone accounts, perform diagnostic tests, and perform many other functions.

One user 105 of cellular telephone network 100 may use two different mobile communication devices 106 and 107. In this example, communication device 106 is a fully-featured cellular telephone, while communications device 107 is a mobile communicator having a simplified user interface as compared with cellular telephone 106, as is described in more detail below. When communications devices 106 and 107 are in close proximity to each other, they may both interact with the same cell as described above. In some embodiments, they may also communicate with each other directly, such as using a Bluetooth, NFC, WiFi, ANT, Zigbee, Z-Wave, or other short range wireless protocol 117 that does not require a telephone switching network.

Cellular network controller 104 may also be in communication with the "plain old telephone system" (POTS) 108. POTS 108 comprises, for example, a large number of traditional wireline telephones and other communications equipment, as well as the infrastructure required to support them. Many residential and small business telephones are part of POTS 108, which may still support telephone hardware that is decades old. The connection between cellular network controller 104 and POTS 108 enables users of mobile telephones using cellular telephone network 100 to call telephones that utilize POTS 108, and vice versa. Cellular network controller 104 may further communicate with similar controllers of other cellular telephone networks, for example networks operated by other cellular service providers.

Another user 109 may carry a mobile communications device 110, which in this example is a mobile communicator similar to mobile communicator 107, and may also use a wireline telephone 111, which utilizes POTS 108.

A private response center (PRC) 112 may be reachable via one or both of cellular network controller 104 and POTS 108. For example, private response center 112 may be operated by a service provider who offers personalized assistance to clients who subscribe to the service. In some embodiments, the service provider may offer personal health management advice, concierge services, navigational assistance, technical support for telephones used in conjunction with the service, or other kinds of personalized services deliverable by telephone. Private response center 112 may be staffed by customer service representatives 113 who answer inquiries from clients of the service. Such a service may especially appeal to clients with health or other impairments. For example, the service could include weekly or daily calls to the client for verification that the client is doing well, and if not, the customer service representative may offer to contact a family member, health care provider, or other resource that may be helpful to the client. The service could include these and other services sold as a package. In some embodiments PRC 112 may be fully automated, not requiring that customer service representatives be present. Such a system may be implemented over the Internet, for example as a cloud-based service.

Private response center 112 is not intended to be a substitute for a public safety answering point such as a 911 emergency response center. A client of the service offered by private response center 112 would still be expected to dial 911 in the event of an emergency.

PRC 112 preferably comprises a computer system 114 that facilitates many of the functions of PRC 112. Computer system 114 includes a display screen 115 and an input device 116 for displaying information to and receiving inputs from a service representative 113. Input device 116 may be, for example, a keyboard, mouse, or other kind of input device or a combination of input devices. While computer system 114 is depicted in FIG. 1 as a single, stand-alone computer, computer system 114 may include multiple interconnected computers, which may be collocated or widely distributed. Computer system 114 may include various forms of data storage, including volatile and nonvolatile memory, and long term data storage. At least some of the data storage holds instructions executable by a processor of computer system 114 to perform functions in accordance with embodiments. For example, computer system 114 may store profile information about clients of PRC 112 so that customer service representative 113 can be informed about a particular client's age, medications, or other information when the client calls PRC 112. Computer system 114 may receive periodic location information from mobile communicators used by clients, such as mobile communicator 107, or from other communication devices used by clients. Computer system 114 may perform many other functions as well.

In one example scenario, the service provider that operates private response center 112 may also be a cellular telephone service provider, and may offer a private assistance service as an adjunct to cellular telephone service. Private response center 112 may be contacted for non-emergency service through a phone number, speed dial or other shortcut, for example by activating a 5 and * key combination. The connection between cellular network controller 104 and private response center 112 is schematic. The actual connection could be by way of the Internet, a wireless connection, a voice-over-Internet-protocol (VOIP) connection, a cellular telephone connection, or any other suitable connection method that enables a telephone user to reach private response center 112 by calling a telephone number. Private response center 112 may be reachable via multiple methods.

Figure 2A:
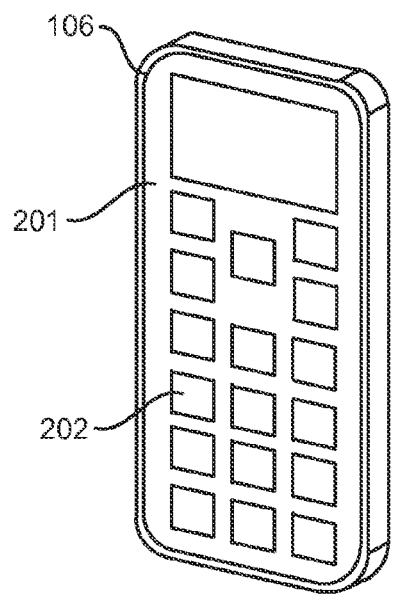
FIG. 2A illustrates a cellular telephone in more detail, in accordance with embodiments of the invention.

FIG. 2A illustrates cellular telephone 106 in more detail. Example cellular telephone 106 may be a so-called "smart phone" or other similar device such as a tablet computer. Smart phone 106 includes complete cellular telephone capability, but may perform many other functions as well, for example running application programs that provide a host of capabilities. A touchscreen 201 or other kind of display may be provided, on which a keypad 202 may be emulated. Cellular telephone 106 also includes a microphone and speaker (not shown) for use as a telephone.

Figure 2B:
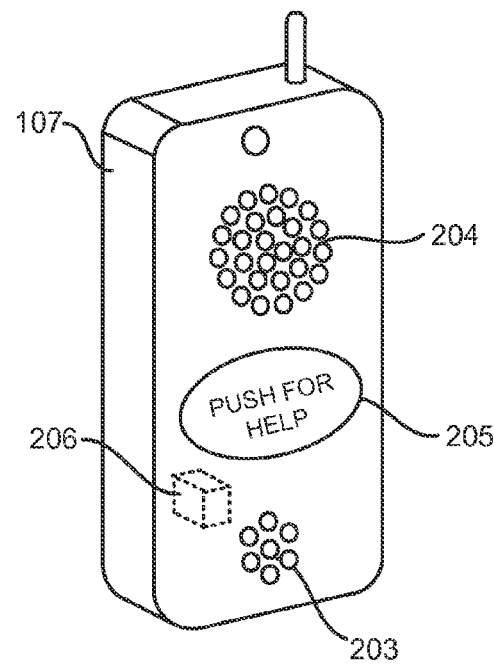
FIG. 2B illustrates a mobile communicator in more detail, in accordance with embodiments of the invention.

FIG. 2B illustrates mobile communicator 107 in more detail. Mobile communicator 107 may be especially useful for some clients of private response center 112. Example mobile communicator 107 may internally be a fully-featured cellular telephone, but has a simplified input interface comprising only one button 205. Mobile communicator 107 may also be referred to as a "fob" or an "emergency communicator." For the purposes of this disclosure, the term "telephone" is intended to encompass mobile communicator 107. A client of private response center 112 may wear mobile communicator 107 on his or her person, and can use it to contact private response center 112 whenever assistance is needed. For example, mobile communicator 107 may be configured to dial private response center 112 when button 205 is pressed. This greatly simplified input interface may be especially helpful to clients with impairments such as poor vision or coordination that make it difficult to operate a conventional cellular telephone that has many small keys. The single-button input interface assures that private response center 112 will be called without the client having to press a sequence of keys. In an event where help is needed, the client may be distraught or disoriented, and the simplified input interface increases the chance of the client reaching private response center 112. For the purpose of this disclosure, a user interface is "simplified" if does not provide for the dialing of arbitrary telephone numbers.

Mobile communicator 107 further includes a microphone 203 and a speaker 204, enabling telephone or telephone-like communication. In some embodiments, mobile communicator 107 does not even include a display, although one may be included on which messages can be shown to the user. In some embodiments, mobile communicator 107 may include an accelerometer 206. Accelerometer 206 may be used, for example, to detect that the user of mobile communicator 107 has fallen, so that private response center 112 can be automatically contacted in that event. Accelerometer 206 may also be used to provide input to mobile communicator 107, and may thus be considered part of the input interface of mobile communicator 107. Microphone 204 may also be considered part of the input interface. That is, the input interface of example mobile communicator 107 comprises one and only one button 205, and also comprises microphone 203 and accelerometer 206. Many other input interface configurations are possible, including configurations having more or fewer input devices. More details about the internal architecture of mobile communicator 107 are given below.

Figure 2C:
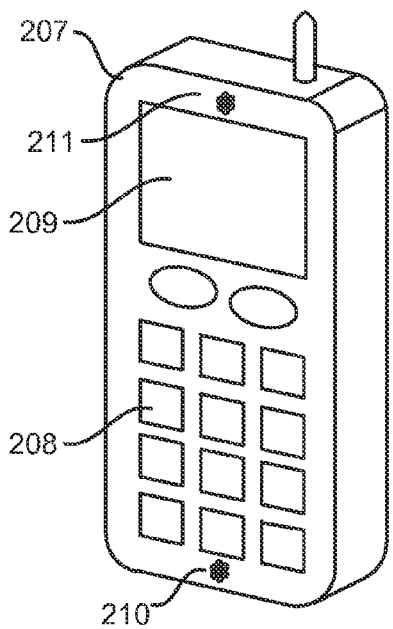
FIG. 2C illustrates another kind of communications device that may be used in embodiments of the invention.

FIG. 2C illustrates another kind of communications device that may be used in embodiments of the invention. Example communication device 207 may be a traditional cellular telephone that includes a keypad 208 usable to initiate telephone calls and perform other functions. A display 209 provides feedback, text messages, or other information to the user of cellular telephone 106. A microphone 210 enables the user to talk to another party during a phone call, issue voice commands to cellular telephone 106, or perform other functions. Speaker 211 enables the user to hear the other part, to listen to audio messages, and the like. Many other features may be present in cellular telephone 106.

Figure 3:
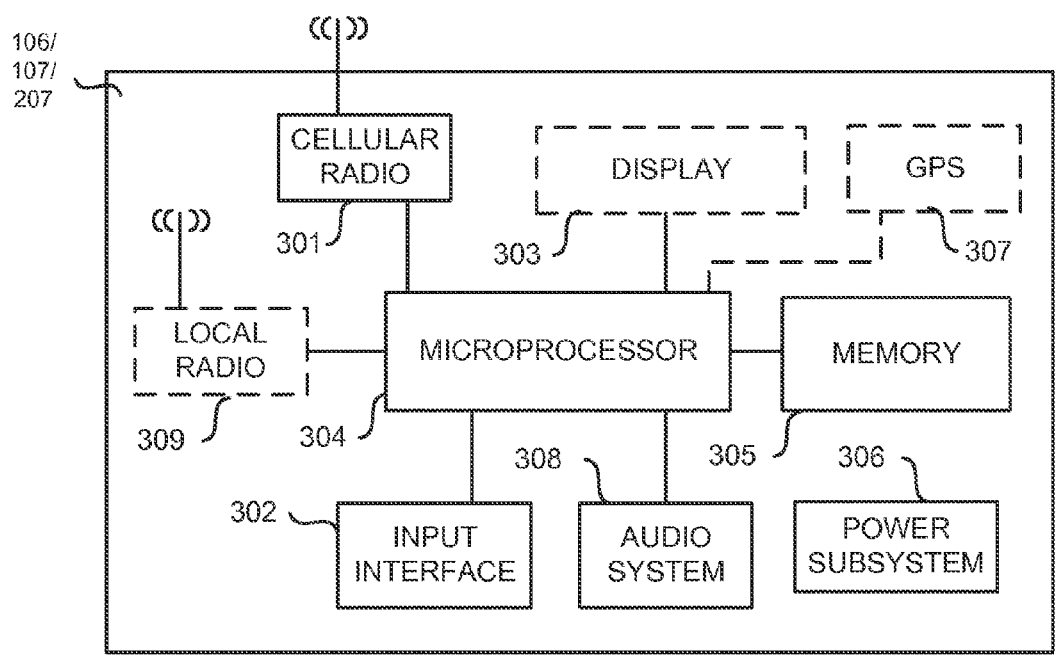
FIG. 3 illustrates a simplified block diagram of an example internal architecture of a mobile communications device suitable for use in embodiments.

FIG. 3 illustrates a simplified block diagram of an example internal architecture of a mobile communications device such as smart cellular telephone 106, mobile communicator 107, or traditional cellular phone 207, suitable for use in embodiments. Certain elements may not be present in all embodiments. A cellular radio transceiver 301 enables communication with cellular telephone network 100. An input interface 302 receives inputs from the user. Input interface 302 may include a single button or a multi-key keypad, and may include a microphone, an accelerometer, or other input devices. A display 303 may optionally be included for communicating information to the user. Display 303, if included, may comprise any means of visually communicating information to the user. For example, display 303 may comprise a backlit or passive liquid crystal display (LCD) or another kind of display capable of showing graphical or alphanumeric information. Display 303 could comprise a simple set of indicator lights, for example made of light emitting diodes or another kind of light source. In some embodiments, display 303 may be a touchscreen display that can receive input from the user, and may be considered to be part of input interface 302. Many other kinds of displays are possible. In some embodiments, no display may be included. The operation of the device is controlled by a microprocessor 304 executing instructions stored in a computer readable memory 305. The instructions, when executed by microprocessor 304, cause the device to perform steps in accordance with embodiments. Computer readable memory 305 may include volatile memory, non-volatile memory, reprogrammable memory, or a combination of these. Microprocessor 304 may be any suitable kind of processor, for example a complex instruction set microprocessor, a reduced instruction set microprocessor, a digital signal processor, a microcontroller, or any other circuitry or combination of components that performs similar functions. A power subsystem 306 routes power to the other components. Optionally, a global positioning system (GPS) receiver 307 may be included, enabling the device to accurately determine its location via GPS. In some embodiments, the power subsystem may include a battery and provision for recharging the battery. An audio system 308 may include such items as a microphone and a speaker, and may provide for audio communication with the user. Other audio functions may also be provided. A local radio transceiver 309 may be provided, for wireless communication separate from communication with cellular telephone network 100. For example, local radio transceiver 309 may include a facility for communicating in accordance with a short range wireless protocol such as Bluetooth. The depiction of the device in FIG. 3 is simplified, and other components may be present.

In one scenario illustrating the need for embodiments of the invention, mobile phone user 105 may use cellular telephone 106 as his or her primary means of communication, using it to place outgoing calls and to receive calls from friends, family, and business associates. If cellular telephone 106 is a smart phone, the user may further use the device for navigation, Internet access, electronic mail, and many other functions.

User 105 may also carry mobile communicator 107 for use in minor emergencies, for reaching private response center 112 easily for other kinds of assistance, or as a backup means of obtaining help in the event of a sudden health event. While mobile communicator is internally a fully-functional cellular telephone and has its own telephone number, the telephone number may be unpublished (and may not even be known to user 105), and mobile communicator 107 will not receive any telephone calls from any party other than PRC 112.

However, in some situations, user 105 may, intentionally or unintentionally, be away from cellular telephone 106. For example, user 105 may wish to go for an extended run or bicycle ride, and may not wish to carry two mobile communications devices. While he or she may have no intention of making telephone calls while away, it may be advantageous to be able to receive calls, in another example, the user may simply leave the house and forget to take cellular telephone 106 along.

If the separation from mobile telephone 106 is intentional, mechanisms exist for relaying telephone calls directed to mobile telephone 106 to another number, assuming that the second number is known. For example, the cellular network provider may provide a call forwarding option that is configurable by user 105. Assuming user 105 knows the telephone number of mobile communicator 107, he or she could dial a special code specified by the cellular service provider and provide the number of mobile communicator 107, to instruct that all incoming calls directed to cellular telephone 106 be automatically forwarded to mobile communicator 107, until the forwarding instruction is canceled. In this state, incoming calls would ring at mobile communicator 107 instead of cellular telephone 106. Once user 105 has returned, he or she would cancel the call forwarding instruction, and incoming calls would once again ring cellular telephone 106. However, this manual call forwarding is not helpful if user 105 does not know the telephone number of mobile communicator 107, is away from cellular telephone 106 unintentionally, or simply forgets to make the forwarding instruction.

In accordance with embodiments of the invention, the need for relaying calls from one communications device to another may be automatically recognized based on a physical relationship between the two devices.

Physical Relationship Detection

The physical relationship may be detected in any suitable way, and may include multiple aspects. For example, if both devices include local radio transceivers, the two devices may periodically seek each other out to determine whether or not they are in close proximity. Accelerometers or GPS receivers may be used to determine whether either or both of the devices are moving. Other physical measurements may be envisioned as well.

The detected physical relationship is compared with a previously-specified condition, and when the condition is met, calls directed to one of the devices are caused to be relayed to the other device. For the purposes of this disclosure, a call is "relayed" from a first device to a second device when the second device is notified of a call originally directed to the first device, by whatever means.

Figure 4:
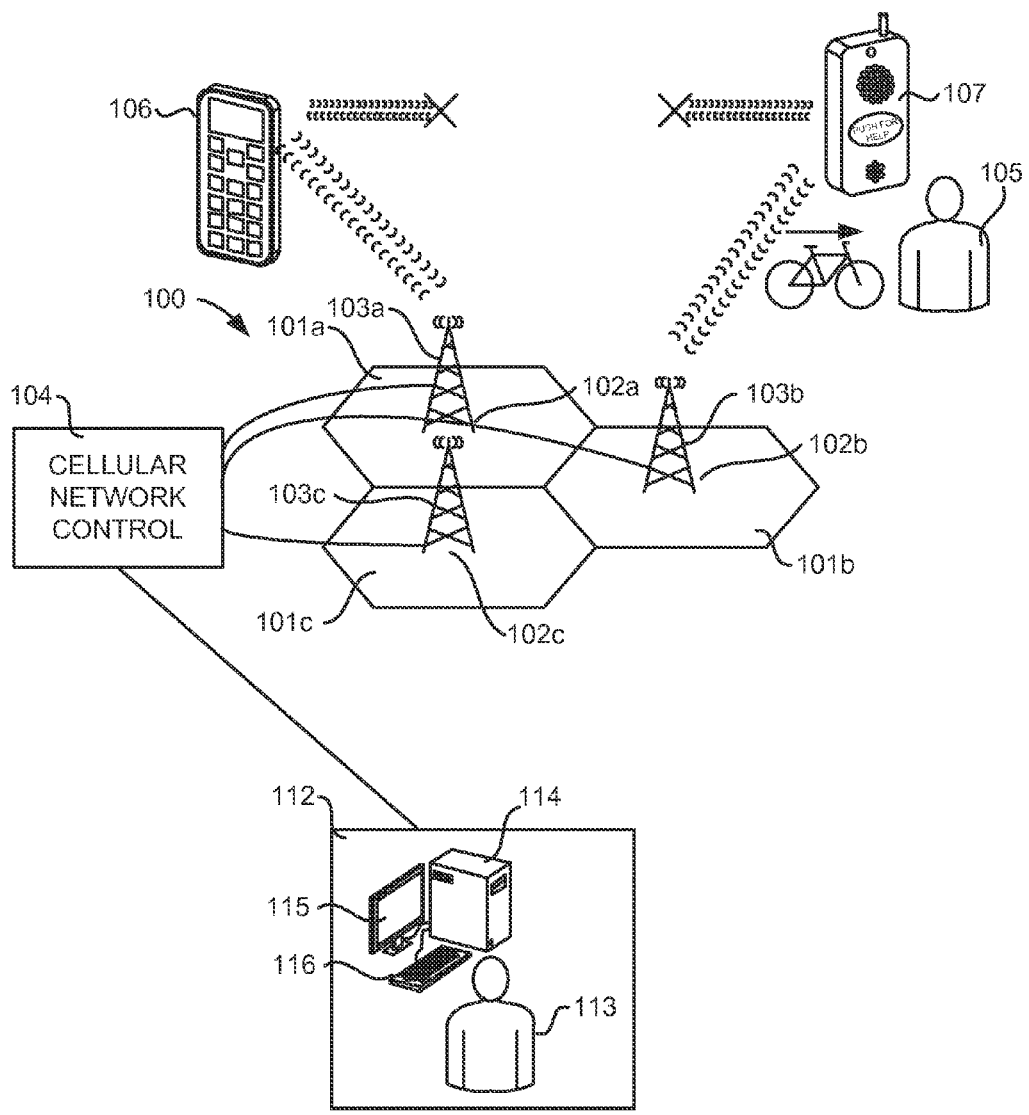
FIG. 4 illustrates a usage scenario in accordance with an example embodiment of the invention.

FIG. 4 illustrates a simple example usage scenario. In this example, user 105 has gone on a bicycle ride, carrying only mobile communicator 107, leaving his or her primary cellular telephone 106 at home. Several aspects of the physical relationship between cellular telephone 106 and mobile communicator may be automatically recognized, by one or more entities in the system. For example, either or both of cellular telephone 106 and mobile communicator 107 may recognize that the two devices are no longer in close proximity, because the short range communication link 117 between them is no longer visible. Cellular network controller may also recognize that the two devices are separated in distance, because the two devices are now interacting with different cellular network base stations. Cellular network controller may be able to further refine the positions of the two devices using trilateration or other techniques.

Private response center 112 may also be able to recognize that cellular telephone 106 and mobile communicator 107 are no longer in close proximity. Either or both of cellular telephone 106 and mobile communicator 107 may be programmed to periodically report its position to PRC 112, as part of the service provided by PRC 112. This process may be referred to as "breadcrumbing", and example techniques for performing breadcrumbing are described in more detail in co-pending U.S. patent application Ser. No. 13/026,158 filed Feb. 11, 2011 and titled "Systems and Methods for identifying Caller Locations" and U.S. patent application Ser. No. 13/276,228 filed Oct. 18, 2011 and titled "Systems and Methods for Identifying Caller Locations", the entire disclosures of which are hereby incorporated by reference herein for all purposes. Having received location determinations from cellular telephone 106, mobile communicator 107, or both, PRC 112 may be able to determine that these two devices are now widely separated. PRC 112 may act on the information, or provide information or directions to one of the two devices. For example, PRC 112 could inform cellular telephone 106 that mobile communicator 107 is in motion, is no longer near mobile telephone 106, or both.

Even if cellular telephone 106 is not configured to report its location periodically to PRC 112, cellular telephone 106 may be able to make the determination that it and mobile communicator are no longer in close proximity. For example, cellular telephone 106 may recognize that the short range communication link between it and mobile communicator 107 is broken. Or cellular telephone 106 may include an application program (particularly if cellular telephone is a "smart phone") configured to periodically query PRC 112 (preferably with the permission of user 105) for information about the location of mobile communicator 107.

Another aspect of the physical relationship of cellular telephone 106 and mobile communicator 107 that may be automatically determined is whether one or both of the devices are in motion. Either or both of the devices may include accelerometers, GPS receivers, or other devices than can indicate motion. In addition, cellular network control may be able to establish that one or both of the devices is moving, based in trilateration information gathered from cellular network 100. PRC 112 may receive periodic location information from one or both of cellular telephone 106 and mobile communicator 107, and may determine from that information that one or both of the devices is in motion. Even if cellular telephone 106 does not report its position to PRC 112, it may query PRC 112 for information about the location of mobile communicator 107, and may make the determination whether mobile communicator 107 is in motion.

Relay Condition Embodiments

Once at least one aspect of the physical relationship of cellular telephone 106 and mobile communicator 107 has been detected, the relationship may be compared with a previously-specified condition, and if the condition is met, calls directed to cellular telephone 106 may be relayed to mobile communicator 107.

Merely by way of example, some conditions that may be utilized are shown in Table 1 below.

TABLE 1

| Condition # | Devices visible through local communication channel? | Cellular telephone 106 moving? | Mobile communicator 107 moving? | Relay calls directed to cellular telephone 106 to mobile communicator 107? | Example scenario |
| --- | --- | --- | --- | --- | --- |
| 1 | Yes | Yes | Yes | No | User has both phone and communicator |
| 2 | Yes | Yes | No | No | Communicator radio is turned off? |
| 3 | Yes | No | Yes | Yes | Phone radio is turned off? |
| 4 | Yes | No | No | No | Phone and communicator are at rest on a table |
| 5 | No | Yes | Yes | No | User left communicator in someone's car |
| 6 | No | Yes | No | No | User has phone, left communicator at home |
| 7 | No | No | Yes | Yes | User has communicator, left phone at home |

TABLE 1-continued

| Condition # | Devices visible through local communication channel? | Cellular telephone 106 moving? | Mobile communicator 107 moving? | Relay calls directed to cellular telephone 106 to mobile communicator 107? | Example scenario |
|---|---|---|---|---|---|
| 8 | No | No | No | Yes | User has communicator and is sitting down |

In the examples of Table 1, conditions 3, 7, and 8 result in calls directed to cellular telephone 106 being relayed to mobile communicator 107, because the detected aspects of the physical relationship of the two devices indicate that the relay may be helpful. For example,e in condition 7, the two devices cannot "see" each other through a local wireless connection such as connection 117, cellular telephone 106 is not moving, but mobile communicator 107 is moving. This set of circumstances strongly suggests that the two devices are not at the same location. Other conditions may be envisioned and utilized, and may utilize other kinds of information, for example GPS or trilateration information to determine whether the devices are close together or moving.

Call Relay Embodiments

Once it has been determined that incoming calls directed to cellular telephone 106 should be relayed to mobile communicator 107, the relay may be accomplished in any suitable way. At least three mechanisms are possible for causing the relay to occur.

In a first call relay technique usable in embodiments, incoming calls directed to cellular telephone 106 may simply be forwarded to mobile communicator 107 as described above. The forwarding may be accomplished by sending command codes and the number of mobile communicator 107 to cellular network controller 104, instructing that when a call is detected as being directed to cellular telephone 106, that the call be forwarded directly to mobile communicator 107 instead. Different cellular network providers may use different command codes. Preferably, the command codes are sent by cellular telephone 106 itself, after cellular telephone 106 has learned of the need to relay calls, although in some embodiments, another entity or device could cause the forwarding to occur, for example mobile communicator 107, cellular network controller 104, or PRC 112. In the case where the telephone number of mobile communicator 107 is not known to the user or to cellular telephone 106, an application running on cellular telephone 106 may query PRC 112 for the number.

Because call forwarding typically bypasses the original destination of the incoming call, once the forwarding is configured, cellular telephone 106 may not be aware of incoming calls. Because cellular telephone 106 may be the user's primary telephone, it may be advantageous to provide an indication that a call was forwarded to mobile communicator 107. One way to accomplish this is for mobile communicator to send a message to cellular telephone 106 any time mobile communicator 107 receives a forwarded call. For example, mobile communicator 107 would be programmed to send a short message service (SMS) message or another kind of indication to cellular telephone 106. In other embodiments, the system may be configured so that if a call forwarded to mobile communicator 107 is not answered, the call is redirected to a voice mailbox associated with cellular telephone 106. In this way, the user of the two devices will know about all calls relayed to mobile communicator 107, either because he or she answers the call at mobile communicator 107, or upon accessing his or her voice mail box associated with cellular telephone 106.

Figure 5:
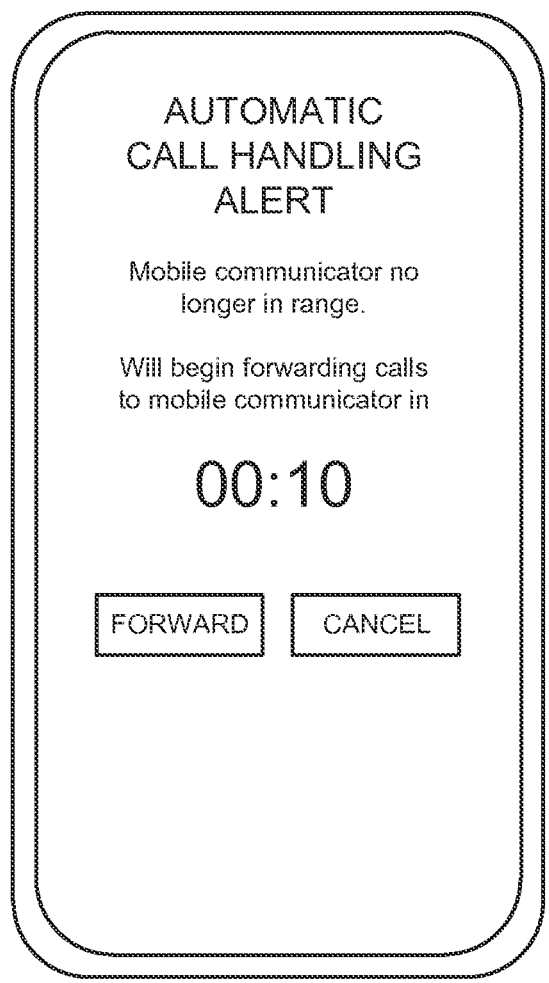
FIG. 5 illustrates a user interface in accordance with embodiments of the invention.

FIG. 5 schematically illustrates relaying calls using call forwarding.

In a second call relay technique usable in embodiments, a "ring-no-answer" treatment may he specified for cellular telephone 106 that results in unanswered calls being relayed to mobile communicator 107. A ring-no-answer treatment specifies how calls are to be handled when they are not answered by the first intended recipient. A default ring-no-answer treatment may be that calls directed to cellular telephone 106 that are not answered are directed to a voice mail box associated with cellular telephone 106. However, according to embodiments of the invention, the default may be changed so that calls originally directed to cellular telephone 106 that go unanswered are relayed to mobile communicator 107. Configuring a ring-no-answer treatment may be accomplished similarly to configuring call forwarding as described above. That is, appropriate control codes and the number of mobile communicator 107 are sent to cellular network controller 104 to configure the relay mechanism.

In some embodiments, mobile communicator 107 may also have a ring-no-answer treatment. For example, if a call relayed to mobile communicator 107 is not answered, the call may be further redirected back to a voice mail box associated with cellular telephone 106.

In a third call relay technique usable in embodiments, cellular telephone 196 may use three-way calling to accomplish the relay. In this technique, an application running on cellular telephone 106 "knows", based on the physical relationship detected earlier between cellular telephone 106 and mobile communicator 107 and one or more tested conditions, that incoming calls are to be relayed to mobile communicator 107. When an incoming call arrives, the application answers the call, but immediately initiates a three-way call with mobile communicator 107. If the call to mobile communicator 107 is answered, the application merges the call, so that the caller can speak directly with the user who answered the call using mobile communicator 107. If the call to mobile communicator 107 is not answered, the call could be automatically directed to a voice mail box associated with cellular telephone 106. This relay technique has the advantage that no control codes of other information need be sent to cellular network controller 104. Cellular telephone 106 can accomplish the relay on its own, possibly after consulting PRC 112 for information about the physical relationship of the two devices or to obtain the telephone number of mobile communicator 107.

In embodiments where cellular telephone 106 initiates the call relay, such as by sending control codes to cellular network controller 104 or by recording the fact that calls should be relayed using three-way calling, cellular telephone 106 may prompt the user before making the relay configuration. For example, once cellular telephone 106 has determined that relaying incoming calls to mobile communicator 107 may be advantageous, it may display a user interface similar to that shown in FIG. 5. The user would have the opportunity to cancel the relay configuration, if desired.

Other Embodiments

While embodiments of the invention have been described above in the context of a user who uses two mobile telephones such as smart phone 106 and a mobile communicator 107, it will be recognized that the invention is not so limited, and that a mobile telephone is but one example of an electronic communication device usable in embodiments of the invention. Other combinations of electronic communications devices may be used, with a telephone call directed to one of the devices being forwarded to the other. For example, different kinds of mobile telephone could be used, such as two fully-featured cellular telephones, including smart phones. In other embodiments, at least one of the devices may be a wireline telephone. In some embodiments, at least one of the devices may not be a telephone.

Referring again to FIG. 1, user 109 carries a mobile communicator 110, but may use wireline telephone 111 as his or her primary telephone for receiving incoming calls at home. When user 109 leaves the house, it may be advantageous for incoming calls directed to wireline telephone 111 to be relayed to mobile communicator 110.

Wireline telephone 111 may include capabilities similar to those of "smart" phone 106, for example a processor and the ability to perform tasks other than simply connecting and disconnecting telephone calls. Wireline telephone 111 may be connected to a computer network, that may be part of the Internet or another network. In one example embodiment, PRC 112 recognizes, based on breadcrumbing reports received from mobile communicator 107, that user 109 may have left home carrying mobile communicator 107. PRC 112 sends a message, for example over a computer network, to wireline telephone 111 indicating that mobile communicator 110 has moved. Wireline telephone 111 may then send control codes to an appropriate switching unit in POTS 108 to configure relaying of calls via call forwarding or a ring-no-answer treatment. Or wireline telephone 111 may configure itself to handle incoming calls by initiating a three-way call with mobile communicator 110, similar to the technique described above. Wireline telephone 111 may present a prompt to allow the relay configuration to be canceled, for example a prompt screen similar to that shown in FIG. 5. This may be especially useful when user 109 leaves home carrying mobile communicator 110, but another family member remains at home and wishes to receive calls using wireline telephone 111.

Figure 6:
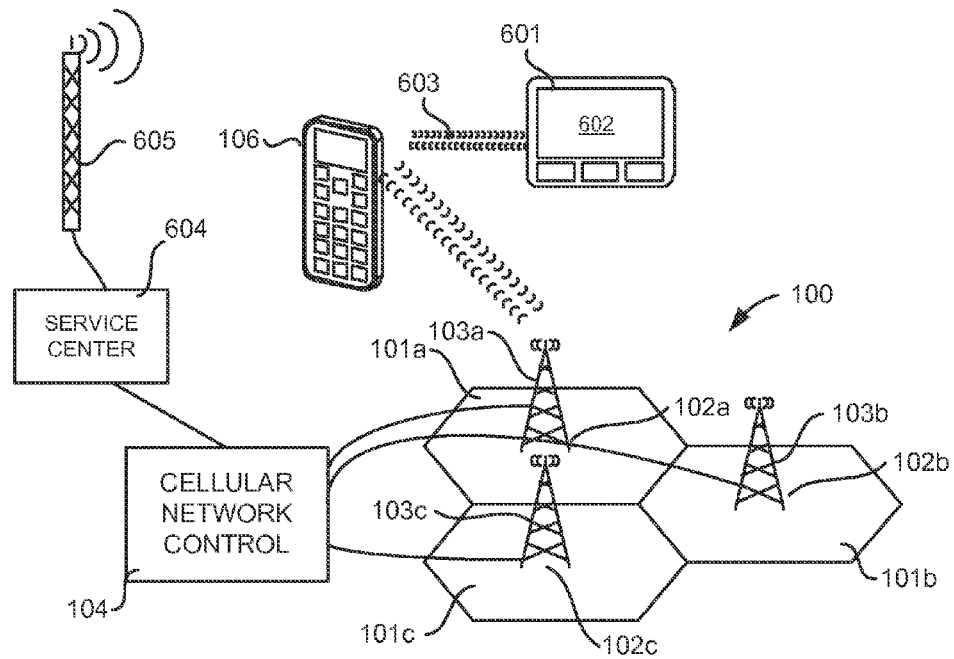
FIG. 6 illustrates another example embodiment.

FIG. 6 illustrates another example embodiment, utilizing a different kind of communication device. In the embodiment of FIG. 6, a message receiving device 601 may include a display 602 for displaying textual information, but lacks a speaker or voice capability. Messaging receiving device 601 also includes the capability to establish a short-range wireless link with smart phone 106. For example, message receiving device 106 may be similar to a pager, with the addition of a Bluetooth, NFC, WiFi, ANT, Zigbee, Z-Wave, or other short range wireless capability.

In a manner similar to the embodiments described earlier, the physical relationship between telephone 106 and message receiving device 601 can be automatically detected, at least by the presence or absence of short range wireless link 603. So long as telephone 106 and message receiving device 601 can "see" each other through link 603, it may be determined that the two devices are in close proximity, and telephone calls directed to smart phone 106 ring through as normal.

However, if the two devices are moved away from each other by a sufficient distance that wireless link 603 is broken, it may be suspected that the user of the two devices has left with message receiving device 601 and is no longer carrying phone 106. This inference can be reinforced by other detected aspects of the physical relationship. For example phone 106 may determine, using an internal GPS receiver or other means, that it has not moved, and therefore message receiving device 601 must have moved. As before, various pre-established conditions may be tested to determine whether calls to phone 106 are likely not to reach the user of phone 106. If the system is used in conjunction with a wireline telephone, it may be sufficient to simply recognize that wireless link 603 is broken.

Once at least one of the conditions is met, the system arranges for the user to receive on message receiving device 601 notice of calls directed to phone 106. For example, once phone 106 determines that notifications should be relayed to message receiving device 601, phone 106 may instigate the relay in any suitable way, including instructing cellular network controller 104 to forward calls directly, instructing cellular network controller 104 to relay calls under a ring-no-answer treatment, or by implementing three-way calling.

In this embodiment, rather than relaying calls to message receiving device 601 (which is an electronic communication device but may have no telephone capability), calls to phone 106 may be relayed to a service center 604. Service center 604 may be a private response center such as PRC 112 that offers other services, or may simply be a service center dedicated to relaying messages. In some embodiments, service center 604 may be fully automated, not requiring that customer service representatives be present. Such a system may be implemented over the Internet, for example as a cloud-based service. Once a call relayed from phone 106 is received at service center 604, service center 604 may notify message receiving device 601 of the fact that a call was received, and may provide other information, for example the number of the person who originally called telephone 106. The notification may be done, for example, using a paging channel, wherein signals are broadcast from an antenna 605 to be received by message receiving device 601. Other arrangements are possible, including using a satellite link for broad coverage. Alternatively, message receiving device 601 may include the capability to receive information over cellular network 100, and any notification may be provided through that channel.

In some embodiments, other kinds of information can be relayed to message receiving device 601. For example, upon receiving a call relayed from phone 106, service center 604 may emulate a voice mail system, playing an outgoing message and requesting a voice message from the caller. Service center 604 may translate the incoming message from speech to text, and send the resulting text to message receiving device 601 for display on display 602. The speech to text translation may be accomplished automatically in sonic embodiments. Service center 604 may store the recorded message in voice mail box associated with phone 106, so that the user can retrieve the audio version of the message at a later time. Alternatively, service center 604 could forward the audio recording to an existing voice mail box associated with telephone 106.

Figure 7:
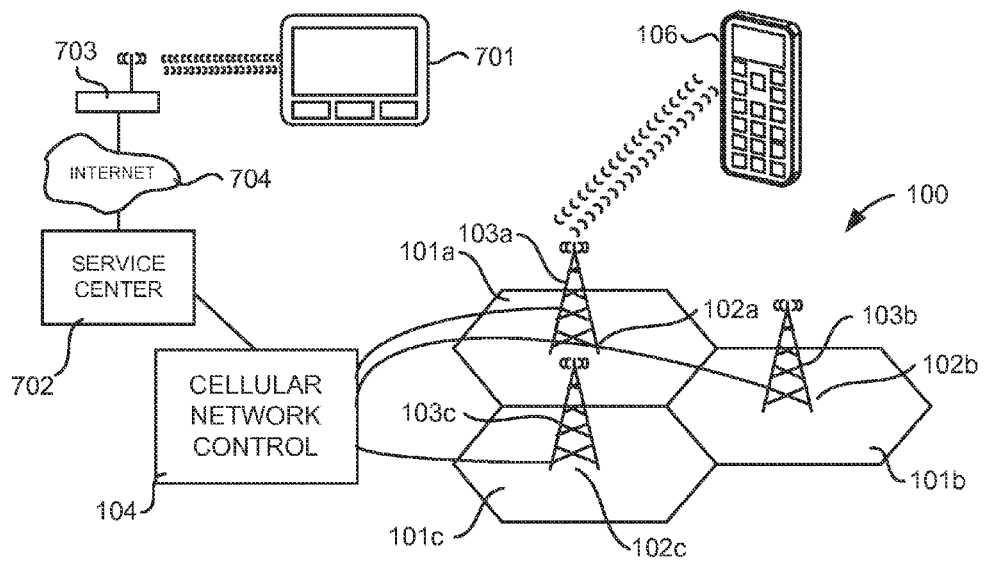
FIG. 7 illustrates yet another example embodiment.

FIG. 7 illustrates another example embodiment. In this embodiment, a message retrieval device 701 includes a short range wireless capability, for example WiFi or another communications capability, but lacks any long range wireless communication capability such as cellular telephone capability. In the embodiment of FIG. 7, it has been determined that messages should be relayed from phone 106 to message retrieval device 701. The determination could have been made automatically, as described above, or manually by a user of the two devices. Once the determination to relay calls has been made, calls directed to phone 106 may be directed to service center 702. Service center 702 may be similar to service center 604 described above, but need not include a paging capability. Rather, message retrieval device 701 may periodically "sniff" for WiFi hotspots such as hotspot 703, and connect to service center 702 when possible through the Internet 704. Alternatively, hotspot 703 may actively scan for any devices that are in proximity and may identify device 701 as a trusted device. An identification of device 701 and the location of hotspot 703 can then be reported to service center 702. Other kinds of connections are possible as well. Service center 702 may then make any messages received for telephone 106 available for retrieval by message retrieval device 701. The messages may be translated from voice to text before retrieval by message retrieval device 701.

Hotspot 703 may be privately provided, for example by a restaurant or coffee shop for the convenience of its patrons and to attract business, or may be provided as part of a public Internet infrastructure. For example, hotspots could be positioned on streetlights or other infrastructure items where electric power is readily available. Hotspot capability may also be include in a smart phone, wrist watch, car, public transportation, or other mobile device that does not belong to the user carrying a device such as message retrieval device 701.

While the principles of the disclosure have been described above in connection with specific apparatuses and methods, it is to be clearly understood that this description is made only by way of example and not as limitation on the scope of the disclosure.

What is claimed is:

1. A method of providing an alternate communication path for telephone calls, the method comprising:
    automatically detecting a physical relationship between a telephone and a second electronic communication device;
    comparing the detected physical relationship with a predetermined condition; and
    causing a telephone call directed to the telephone to be relayed to the second electronic communication device when the condition is met;
    wherein automatically detecting a physical relationship between the telephone and the second electronic communication device comprises automatically detecting whether at least one of the telephone and the second electronic communication device is in motion, and wherein the predetermined condition includes consideration of whether or not at least one of the telephone and the second electronic communication device is in motion.

2. The method of claim 1, wherein the telephone is a first telephone and the second electronic communication device is a second telephone.

3. The method of claim 2, wherein causing a telephone call directed to the first telephone to be relayed to the second telephone comprises sending an instruction configuring a telephone switching network to forward telephone calls directed to the first telephone directly to the second telephone.

4. The method of claim 3, further comprising sending a second instruction configuring the telephone switching network to, when the forwarded call to the second telephone is not answered, redirect the forwarded call to a voice message system associated with the first telephone.

5. The method of claim 3, further comprising for each telephone call forwarded to the second telephone, automatically sending a message to the first telephone identifying the party who placed the telephone call directed to the first telephone.

6. The method of claim 5, wherein the message is a short message service message.

7. The method of claim 3, further comprising prompting a user for a confirmation before sending the instruction configuring the telephone switching network to forward telephone calls directed to the first telephone directly to the second telephone.

8. The method of claim 2, wherein causing a telephone call directed to the first telephone to be relayed to the second telephone comprises sending an instruction configuring a telephone switching network to redirect telephone calls directed to the first telephone to the second telephone when the first telephone is not answered.

9. The method of claim 8, further comprising sending a second instruction configuring the telephone switching network to, when the call redirected to the second telephone is not answered, further redirect the redirected call to a voice message system associated with the first telephone.

10. The method of claim 2,
    wherein causing a telephone call directed to a first one of the two telephones to be relayed to the second one of the two telephones comprises:
    receiving by the first telephone an incoming call directed to the first telephone;
    initiating a three-way call with the second telephone; and
    when the second telephone is answered, merging the incoming call into the three-way call.

11. The method of claim 10, wherein when the second telephone is not answered, redirecting the incoming call to a voice message system associated with the first telephone.

12. The method of claim 1, wherein the telephone is a mobile telephone.

13. The method of claim 1, wherein the second electronic communication device is a mobile communicator having a simplified user interface.

14. A method of providing an alternate communication path for telephone calls, the method comprising:
    automatically detecting a physical relationship between a telephone and a second electronic communication device;
    comparing the detected physical relationship with a predetermined condition, wherein the predetermined condition includes consideration of one or more criteria selected from the group consisting of a.) whether or not at least one of the telephone and the second electronic communication device is in motion, b.) whether or not the telephone can detect the second electronic communication device through the local wireless connection directly between the telephone and the second electronic communication device and, c.) whether or not the telephone and the second electronic communication device are widely separated; and
    causing a telephone call directed to the telephone to be relayed to the second electronic communication device when the condition is met;
    wherein the second electronic communication device does not include voice capability, and wherein causing a telephone call directed to the telephone to be relayed to the second electronic communication device further comprises:

causing at least some audio content of the telephone call to be converted to textual information; and causing the textual information to be sent to the second electronic communication device.

15. The method of claim 1, wherein automatically detecting a physical relationship between two telephones comprises automatically detecting whether the two telephones can directly communicate over a channel that does not require a telephone switching network.

16. A telephone, comprising: a transceiver for communicating with a telephone switching network;
- a user interface;
- a processor; and
- a memory; wherein the memory holds instructions that when executed by the processor cause the first telephone to:
- obtain from an external source an indication that, based on the physical relationship of the first telephone and a second electronic communication device as determined by the external source, incoming calls directed to the first telephone should be relayed to a second electronic communication device, wherein the indication that incoming calls should be relayed is based on one or more criteria selected from the group consisting of a.) whether or not at least one of the telephone and the second electronic communication device is in motion and b.) whether or not the telephone and the second electronic communication device are widely separated; and
- based at least in part on the obtained indication, cause an incoming call directed to the telephone to be relayed to the second electronic communication device.

17. The telephone of claim 16, wherein the telephone is a first telephone and the second electronic communication device is a second telephone.

18. The telephone of claim 17, wherein the external source is a private response center.

19. The telephone of claim 17, wherein the instructions, when executed by the processor, cause the first telephone to configure a telephone switching network to forward telephone calls directed to the first telephone directly to the second telephone.

20. The telephone of claim 17, wherein the instructions, when executed by the processor, cause the first telephone to configure a telephone switching network to redirect telephone calls directed to the first telephone to the second telephone when the first telephone is not answered.

21. The telephone of claim 17, wherein the instructions, when executed by the processor, cause the first telephone to:
- receive an incoming call directed to the first telephone;
- initiate a three-way call with the second telephone; and
- when the second telephone is answered, merge the incoming call into the three-way call.

22. The telephone of claim 16, wherein the instructions, when executed by the processor, cause the first telephone to present a prompt before configuration of the telephone to cause the incoming call directed to the first telephone to be relayed to the second electronic communication device.

23. A telephone, comprising:
- a transceiver for communicating with a telephone switching network;
- a user interface;
- a processor; and
- a memory; wherein the memory holds instructions that when executed by the processor cause the first telephone to:
- obtain information about the physical relationship of the telephone and a second electronic communication device, wherein at least some information about the physical relationship is derived from the status of a local wireless connection directly between the telephone and the second electronic communication device; and
- based at least in part on a determination from the obtained information that the telephone cannot detect the presence of the second electronic communication device through the local wireless connection, cause an incoming call directed to the telephone to be relayed to the second electronic communication device.

24. The telephone of claim 23, wherein the incoming call directed to the telephone is caused to be relayed to the second electronic communication device based at least in part on whether the telephone is in motion.

25. The telephone of claim 24, wherein the incoming call directed to the telephone is caused to be relayed to the second electronic communication device when the telephone cannot detect the presence of the second electronic communication device through the local wireless connection, and when at least one of the telephone and the second electronic communication device is in motion.

* * * * *